United States Patent [19]
Sarin et al.

[11] Patent Number: 6,003,011
[45] Date of Patent: Dec. 14, 1999

[54] WORKFLOW MANAGEMENT SYSTEM WHEREIN AD-HOC PROCESS INSTANCES CAN BE GENERALIZED

[75] Inventors: Sunil K. Sarin, Watertown; Alexis Layton, Cambridge, both of Mass.

[73] Assignee: Xerox Corporation, Stamford, Conn.

[21] Appl. No.: 09/003,701

[22] Filed: Jan. 7, 1998

[51] Int. Cl.[6] .................................................. G06F 17/60
[52] U.S. Cl. .................................................. 705/9; 705/8
[58] Field of Search ....................... 705/8, 9; 364/281.3, 364/281.8

[56] References Cited

U.S. PATENT DOCUMENTS

| | | | |
|---|---|---|---|
| 5,179,698 | 1/1993 | Bachman et al. | 707/4 |
| 5,216,592 | 6/1993 | Mann et al. | 705/8 |
| 5,301,320 | 4/1994 | McAtee et al. | 395/650 |
| 5,319,543 | 6/1994 | Wilhelm | 364/401 |
| 5,517,663 | 5/1996 | Kahn | 395/800 |
| 5,535,389 | 7/1996 | Elder et al. | 395/712 |
| 5,559,606 | 9/1996 | Webster et al. | 358/296 |
| 5,630,069 | 5/1997 | Flores et al. | 395/207 |
| 5,655,086 | 8/1997 | Jury et al. | 705/9 |
| 5,671,360 | 9/1997 | Hambrick et al. | 705/9 |
| 5,706,452 | 1/1998 | Ivanov | 345/331 |
| 5,818,715 | 10/1998 | Marshall et al. | 705/8 |
| 5,890,133 | 3/1999 | Ernst | 705/7 |

OTHER PUBLICATIONS

Anderson, Mike, "Workflow Engine Interoperability: What's in It for Users?" Document World, vol. 2, No. 3, pp. 51–53, May/Jun. 1997.

An article by Sarin et al., "A Process Model and System for Supporting Collaborative Work," Proceedings of the Conference on Organizational Computing Systems, Atlanta, GA, Nov. 5–8, 1991.

*Primary Examiner*—James P. Trammell
*Assistant Examiner*—Nicholas D. Rosen
*Attorney, Agent, or Firm*—R. Hutter

[57] ABSTRACT

In workflow management software, task objects describing a successfully-completed workflow process instance are copied. The copied task objects are then generalized in the relevant variables thereof, so that the entire workflow process is thus generalized for direct re-use in an amended workflow process definition. In this way, ad-hoc amendments to the workflow process, such as those initiated by the persons who collaborate in the work process, can be easily incorporated into a new work process.

3 Claims, 7 Drawing Sheets

6,003,011

WORKFLOW MANAGEMENT SYSTEM WHEREIN AD-HOC PROCESS INSTANCES CAN BE GENERALIZED

FIELD OF THE INVENTION

The present invention relates to an improvement in workflow management software.

BACKGROUND OF THE INVENTION

"Workflow management software" has gained acceptance in the past few years as a medium for automating traditional office processes, such as, for example, processing of insurance claims. Briefly, the function of workflow management software is to provide specific sets of information, such as individual documents, to a series of persons, or other entities such as computers, in a given sequence so that the various persons or other entities can, for instance, approve, modify, or otherwise process the information according to a pre-designed total work process.

In a common commercial version of workflow software, such as that sold under the trade name "InConcert™," a collaborative process is defined as a sequence of "tasks." A "task" can be generally defined as an instance in which what is called an entity (such as a person, one of a predefined group of persons, or a computer or printer) is assigned a "role" having a specifically-defined interaction with a set of information, through what is called a "binder." A binder, for present purposes, is a reference to some quantity of data, such as a document or a quantity of code, such as would be derived from, for example, a form filled out by a customer. A plurality of tasks are assigned interrelations, such as a sequence, which may have finish-start (FS), parallel, alternative, or if-then paths, to form the entire process. (Formal definitions of these terms, as they relate to the present invention, will be given below.) In the specific case of InConcert™ software, these individual tasks are each assigned an icon by type (such as "approve," "fill out form," "send to manager," etc.) with these icons being arranged by the designer of the process on a graphical user interface.

In the traditional model of applying workflow management software to a real-world process, such as processing an insurance claim, the basic process, meaning the arrangement of tasks forming the process, is established a priori by a process designer, who in effect imposes the process design on the persons and systems who will carry out the process. The burden falls on the process designer to do the initial "research" into the objectives and requirements of the entire process, and the people who collaborate on the workflow must conform to it. It has been found, however, that in practical applications of workflow management software, a process designer often does not have enough information or practical insights to successfully design the workflow of the process ahead of time. It is more likely that persons who have traditionally carried out the process will have greater knowledge of certain nuances of the process that would not be apparent to a process designer. In some cases the persons who are to carry out the process can assist the process designer in developing the process definition, but this still incurs the effort and overhead of a priori analysis and cannot anticipate the variety of actual process executions that may occur when the participants actually carry out their work. The present invention is thus directed to enabling a system where an initial basic business process can be amended, and therefore caused to evolve as a result of ad-hoc inputs from various persons involved in the process while the process is running.

DESCRIPTION OF THE PRIOR ART

The article by Sarin et al., "A Process Model and System for Supporting Collaborative Work," *Proceedings of the Conference on Organizational Computing Systems*, Atlanta, Ga., Nov. 5–8, 1991, sponsored by the Association for Computing Machinery (ACM), one co-author of which is a co-inventor of the present application, discloses the basic principles of object-based workflow management software.

U.S. Pat. No. 5,301,320 discloses a basic workflow management and control system, wherein a designer first defines a workflow by providing a template of business activities that expresses the manner in which these activities relate to one another.

U.S. Pat. No. 5,319,543 discloses a workflow management program for automatic and prioritized assignment of work involving processing of medical information records to particular resources or personnel in a hospital. In particular, the workflow program identifies newly-obtained medical records and identifies which additional records constitute a new encounter for a particular patient.

U.S. Pat. No. 5,517,663 discloses a workflow management program which exploits animation on the user interface to allow a programmer to visualize programming flow and operation. Animated depictions are thus produced for dynamic phenomena, such as concurrent computations.

U.S. Pat. No. 5,630,069 discloses a workflow management program having two functional sets. One is a set of graphical tools that can be used by a business analyst to map out business processes. The second is a set of tools that can be used to document and specify in detail the attributes of each workflow definition, including roles, timing, conditions of satisfaction, forms, and links required to complete a business process definition.

SUMMARY OF THE INVENTION

According to the present invention, there is provided a method of creating a process definition describing a generic workflow process, from a process instance describing an actual process execution. The process instance includes a plurality of task objects, each task object corresponding to a task in the workflow. Each task object includes a role space for holding a role variable symbolic of an entity required to perform a task, a binder space for holding a binder variable referring to a quantity of information required to perform the task, and a state space for holding a state variable symbolic of a current state of the task corresponding to the object. The process instance is copied, while preserving the interrelationships among task objects, thereby yielding a copied process. The variable in the state space in every task object in the copied process is changed to a time-independent value, thereby yielding a new process definition.

DETAILED DESCRIPTION OF THE INVENTION

For purposes of the following description, certain specific terms will here be defined:

PROCESS DESIGN: The act of designing/constructing a process definition.

PROCESS DEFINITION: A specification or template that outlines how a particular kind of business process is expected to be executed (or enacted). Also known as Job Template (in 1991 paper referenced above), Workflow Process Definition, or Workflow Definition.

PROCESS INSTANCE: An actual business process being executed/enacted. A process instance is instantiated (or "copied") from a process definition, and may contain assignments (of roles and binders) as well as changes to the task structure of the process definition. Also known as Active Job (in 1991 paper).

PROCESS: A Process Definition or Process Instance.

TASK: A unit of work in a Process. A Process (Definition or Instance) comprises a number of Tasks (Definitions or Instances).

TASK DEFINITION: a Task in a Process Definition.

TASK INSTANCE: a Task in a Process Instance.

Figure 1:
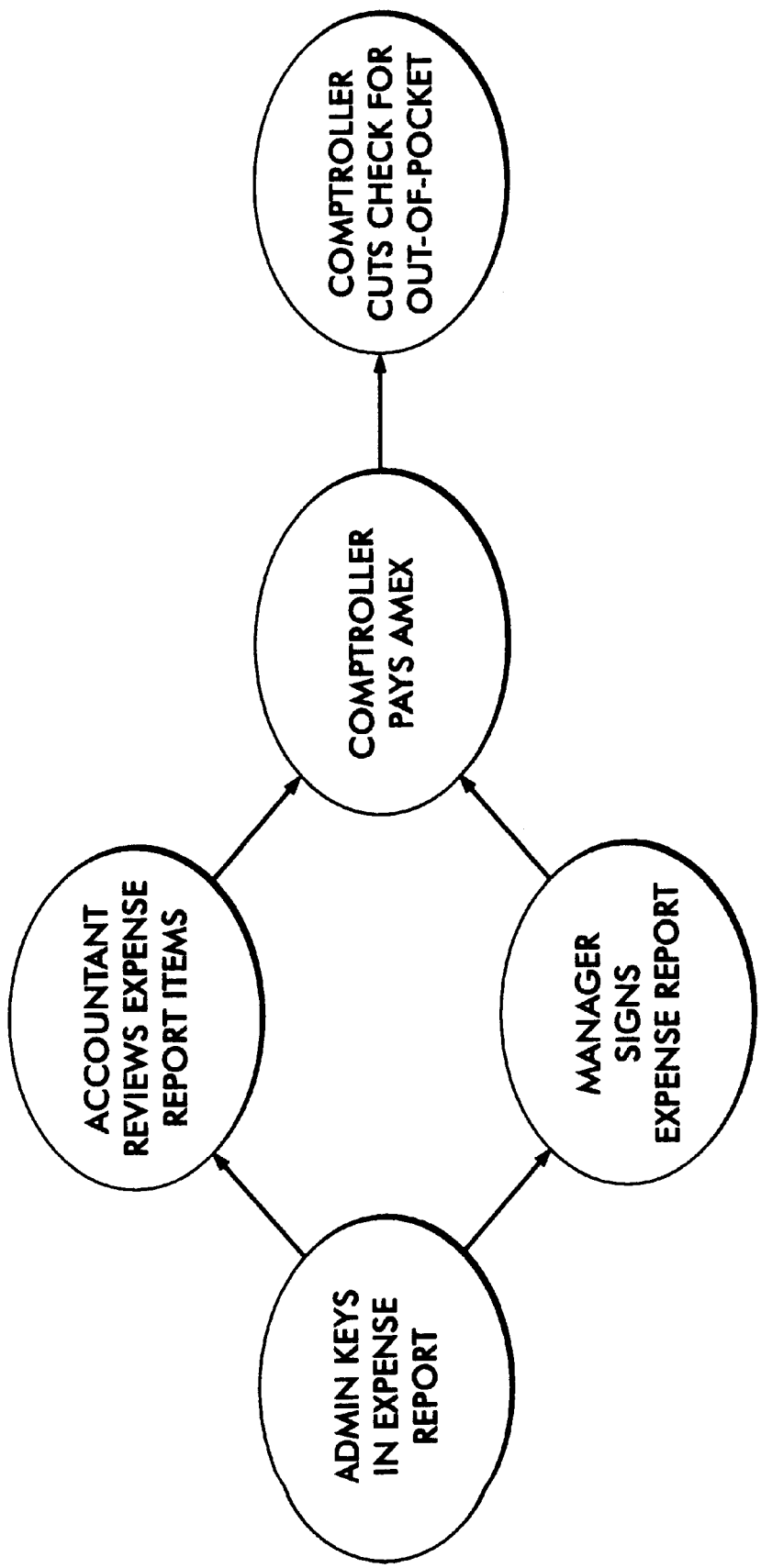
FIG. 1 is a diagram showing the interrelationship of workflow tasks in a typical workflow process definition.

FIG. 1 is a simple diagram showing the interrelationship of tasks in a workflow process. Such a diagram would be not unlike the display of a process on a user interface in a commercial workflow management software program such as "InConcert™." The example process of FIG. 1 consists of five tasks: first, an administrator keys in the expense report; an accountant reviews the expense report items; a manager signs the expense report; a comptroller pays American Express for credit-card items; and then the comptroller cuts a check to cover out-of-pocket expenses. As arranged from left to right, what is intended by the interrelationships symbolized by the arrows is a time-sequence. It will be noted that the reviewing and the signing tasks are arranged in parallel; typically, this means that the two tasks can be performed simultaneously, because they are performed by different persons.

The individual tasks illustrated in FIG. 1, which could be shown as icons in a user interface, are graphical manifestations of underlying activities of the workflow software. For instance, the leftmost task in the process of FIG. 1, the administrator keying in the expense report, refers to the appearance of a blank expense report form on the administrator's computer screen with the administrator being instructed to key in the amounts for the expense report into blank spaces on the form (alternately, the instruction could be to have the administrator scan in the hard-copy from via OCR software). Once the form is keyed in by the administrator, the workflow software then initiates sending the keyed-in electronic expense report form to the accountant for review, and may further cause the expense report to be printed out at a printer near the manager's desk so that the manager may sign it. The task of the comptroller paying American Express may require, on the comptroller's screen, a display of the expense report as approved by the accountant, and also require the comptroller to physically date-stamp the printed and signed expense report received from the manager. Then, the workflow software may cause to be displayed on the comptroller's screen a password-protected blank form which the comptroller causes to credit the account of American Express for the necessary amount. Finally, the last task may cause the amount of out-of-pocket expenses to be calculated, and a MICR check printed for signing by the comptroller. In summary, although the task icons shown in the UI of FIG. 1 give a general overview of an entire process, it will be understood that each individual task icon in effect "calls forth" various other programs which appear on the screens of the persons or other entities who perform the work process.

The tasks shown in FIG. 1 are caused to be interrelated to form a complete process, such as shown by the arrows which connect pairs of icons. In a programming sense, these arrows are manifestations of object-oriented programming instructions, such as a "finish-start" or "FS" instruction, which would mandate that the first process in the pair finish before the second process could begin. Thus, a process definition describing a business process can be understood as a sequence of task objects bound by a set of interrelationships, as will be described in detail below.

Figure 2:
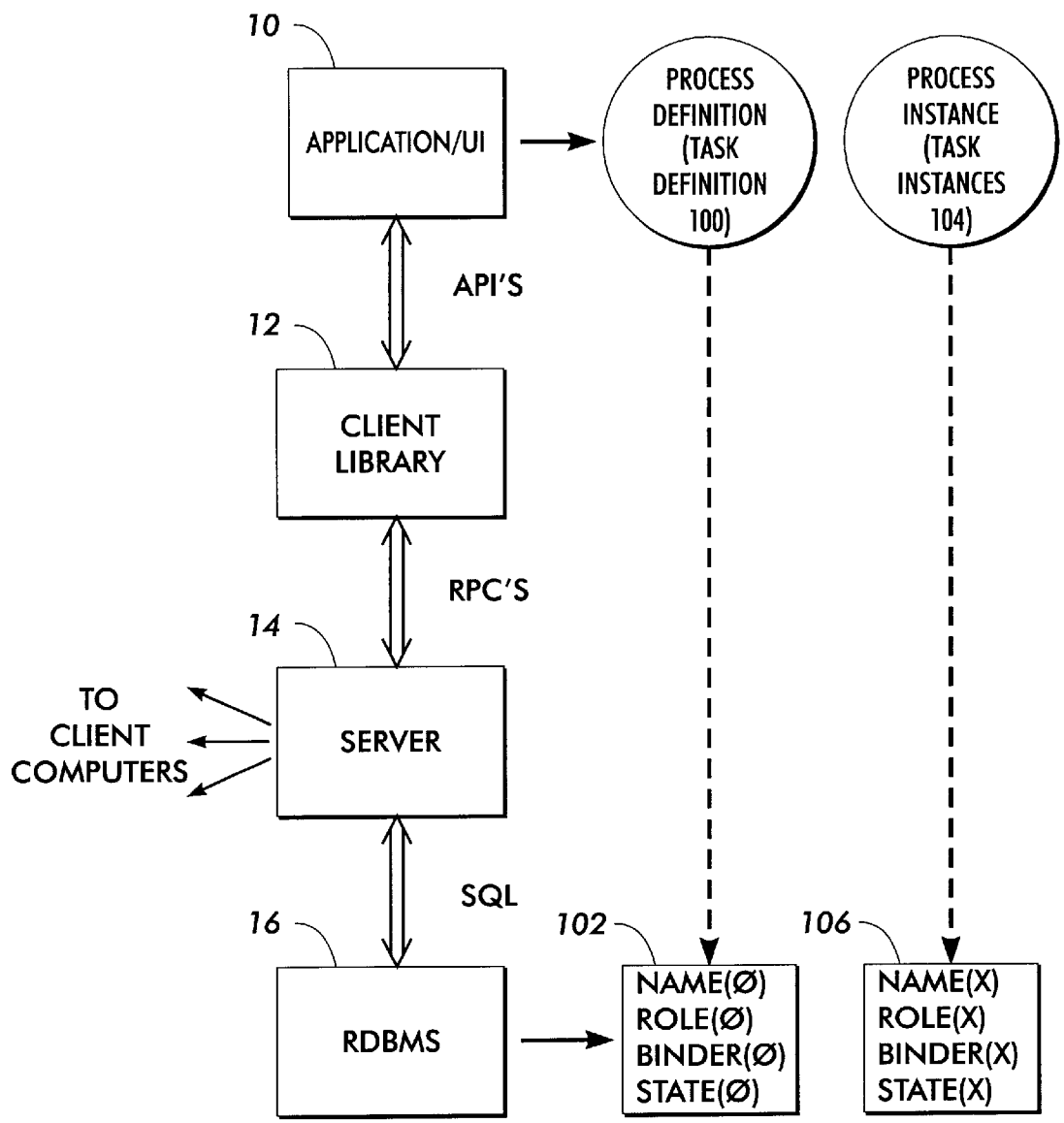
FIG. 2 is a diagram showing the various programming levels of workflow management software, showing the relationship between task-based icons at the user interface level with programming objects at a deeper level.

FIG. 2 is a diagram showing the essential layers of a workflow system incorporating the present invention. The left side of the diagram illustrates the interaction of various programming levels in a workflow software system. The "top level" of the system is the "application," indicated as 10, which includes code for creating the user interface such as shown in FIG. 1. The application 10 interacts with a client library indicated as 12, through a series of application programming interfaces (API's). The client library 12 carries out various functions on the tasks which are created by a user or process designer through application 10, in a manner known in the art. The client library 12 in turn interacts, through remote procedure calls (RPC's), to a workflow server 14. Basically, the workflow server 14 acts as the clearinghouse for the exchange of instructions, according to the workflow software, to various computers involved in the workflow process. For example, if at one point in a workflow process it is required that a certain form appear on a certain computer screen, it is the function of the server 14 to make sure that the form is displayed on the correct screen at a particular time.

The bottom level of workflow software, interfaced by server 14 using SQL, is the relational database management system, or RDBMS, indicated as 16. The RDBMS 16 is the situs of the various programming objects which correspond to the tasks forming a given job or process. In other words, any process or workflow created by a process designer using application 10 is ultimately manifest as a set of programming objects within RDBMS 16, as will be explained below.

Henceforth in this description, what has been described generally as "tasks," that is, the sequence of interactions together forming a workflow process, shall be described in more specific terms. A task such as, for example, approving a document can be described in one of two ways: a "task definition," which is a description of a task, and a "task instance," which is a specific example of execution of a task definition. For instance, if a task definition is "approve an expense report," a task instance based on this task definition would be something like "manager Smith approves expense report No. 345, in the amount of $750.00, task completed." In other words, while a task definition describes a general case, as would be considered by a process designer designing a process, a task instance is a specific case of the process being carried out. In programming terms, the task definition can be considered an object with spaces for variables, while a task instance is the same object as a task definition, only with specific values placed in the variable spaces. Once again, a plurality of interrelated task definitions form a process definition, and a plurality of interrelated task instances form a process instance.

With reference to the right-hand side of FIG. 2, it can be seen that task icons created by a process designer on the UI as part of application 10 refer, ultimately, to objects in the RDBMS 16 (the functions of client library 12 and server 14 are not immediately relevant to the present description). In the illustrated embodiment, a task definition 100 refers to a task object 102 and a task instance 104 refers to a task object 106. In the illustrated embodiment, a task definition 100 will have at least four variable spaces in its associated object 102. Although, of course, further variables will be possible, in the present instance these variable spaces are:

NAME: The name of the task;

ROLE: The name of persons or other entities (such as a specific computer or printer) that will carry out the task;

BINDER: Links to one or more documents which are required to perform the task, such as a scanned-in form, a blank form template, etc.; and STATE: A space for placing a variable symbolic of an instantaneous state of the particular task when the task is being applied on a real-time process.

In a particular case, an object may include more than one space for different ROLEs, such as if two persons or classes of persons are required to carry out the task, or more than one space for different BINDERs, such as if two or more documents or types of documents must be accessed to perform the task.

As known in the prior art, such as in early versions of "InConcert™" software, a process designer typically first creates a generalized "process definition" describing the desired workflow process. A process definition comprises a number of interrelated task definition objects, each task definition object corresponding to one task in the process. A task definition 100 is an object in which at least the state, and perhaps further variables, in the task object 102 are left in a time-independent "empty" state. In order to convert a generalized task definition 100 into a task instance 104, the variable spaces in the task object such as 102 are filled in with real values, thus yielding a task instance object such as 106. A task instance object is thus created as the result of a process definition being applied to real data when the actual workflow process is carried out.

When the process designer creates a process definition, he may insert selectable, or semi-specific, variables to be eventually placed in the variable spaces when the process runs. Such a "template" process definition would have the variables in the spaces therein as follows:

NAME: [approve expense report]

ROLE: [managers: (Smith, Jones, Williams)]

BINDER: [expense report serial no. (insert number)]

STATE: [(empty)]

This "template" task definition object, one of a number of such task objects which together form a "template" process definition, is made only somewhat specific to the purpose of approving expense accounts. Here, the persons who could perform the ROLE of approving the expense report are defined as a "pool" of managers, which in a specific case is any one of the three managers Smith, Jones, and Williams. The BINDER space is intended to be filled in with the specific serial number of a particular expense account being approved. The STATE in the template is "empty," for reasons which will be explained below. Further variable spaces may be provided in a process definition object such as 102 including, for example, an ID for the employee submitting the expense report; the amount of the expense report; and any other variables which may be relevant to the specific workflow process.

To continue the present example, this is an example of the variables in a task instance object 106:

NAME: [approve expense report]

ROLE: [manager: (Williams)]

BINDER: [expense report serial no. (345)]

STATE: [done]

It will be noted that a task instance object 106 will have a time-specific STATE at any given time: if the action associated with the task object is not yet ready to be performed, the STATE will be "waiting," if the action is ready but has not yet started, the STATE will be "ready", if the action is being done at the moment, the STATE will be "acquired," and if the action is completed, the STATE will be "done." In the present embodiment, the state of a task definition object is "empty," which for purposes of the claims is a "time-independent" state; i.e. a suitable state for an object which is not part of a process definition which is being executed.

Each task object will further have associated therewith a software mechanism by which the function of the associated task is carried out, such as a call to print out a specific expense report in the printer belonging to a given manager, so that the manager may sign it.

To summarize the above description of the behavior of process instances, the following "life cycle" of a process instance can be described thus:

1) INSTANTIATION, from a Process Definition. A copy of the entire process definition is made, and the task instances are given state.

2) ASSIGNMENT of roles and binders.

3) ENACTMENT (or Execution) of the tasks in the process, such as by displaying a necessary window on a screen and receiving an approval, printing out a document, etc. During this time, other bindings or reassignments may happen, and the task structure may change 4) COMPLETION. Eventually, all tasks reach the state "done" (or "skipped," for tasks that did not need to be performed in this process instance), or the process instance is abandoned prematurely.

In the classic model of the application of workflow software by which a process to be completed by the collaboration of various persons, a process designer organizes the basic process definition as a sequence of these tasks, and then programs the individual tasks. Only when the workflow software is "up and running," e.g., with actual insurance claims, expense reports, etc., filling in the variable spaces in the task definition objects such as 102, is a set of processes, each comprising a set of tasks, created. In short, under the classic workflow software model, the entire process is designed a priori, and then the persons who must collaborate in making the process work literally fill their assigned "roles."

According to the present invention, however, there is provided a means whereby the overall design of a workflow process comprising a series of dependent tasks, can be designed not a priori, but rather generalized from a pre-existing set of actual process instances which contain changes that were not anticipated at the time of designing the original process definition.

According to the present invention, there is provided, as part of a workflow management software program, a capability which is here called "create template." The function of the "create template" function is in effect to copy a pre-existing process instance comprising a set of tasks, and generalize the specific process instance into a process definition in which all of the task instances are replaced with task definitions. The overall structure of interrelations among the tasks (i.e., the arrows in FIG. 1) is retained. The result is that the copied process is a generalized version of a specific process which may have been serendipitously created as a result of the experience of persons actually performing the tasks in the specific process.

In a programming sense, the creation of the generalized or "template" process involves two basic steps: copying the original specific process by copying each individual task instance 104 in the process and further retaining interrelationships (such as FS instructions) of the task instances 104, and then "generalizing" each individual task instances such as 104 to in effect remove references to specific values in the variable spaces of the objects such as 106. In short, in the copied template, what had been a set of task instance objects such as 106 are each converted into task definition objects 102.

With regard to each task definition object 102 in the generalized process, the most essential alteration from the original task instance object 106 is to convert whatever value happened to be in the STATE variable space in process instance object 106 from a specific value (usually "done", in the case of a process instance describing a completed process) to what is referred to in the claims as a time-independent value, which in the context of InConcert™ workflow software is "empty," but which could also conceivably be "waiting." Thus, in a successful implementation of an actual process comprising task instances, if the process has already been completed, all of the STATE variables in the task instance objects 106 forming the process instance will be "done." As part of the generalization step of the present invention, all of these "done" variables are automatically, in one user operation or command, changed to "empty." What is important is that the STATE variable in the task definition object be in a state where new data can be accepted by the process definition object at any time, so that the task object can be called into service when the overall process definition is put to use and the various variable spaces in the newly-created process definition receive specific values. This is the key step in turning a process instance to a generalized process definition.

Figure 3:
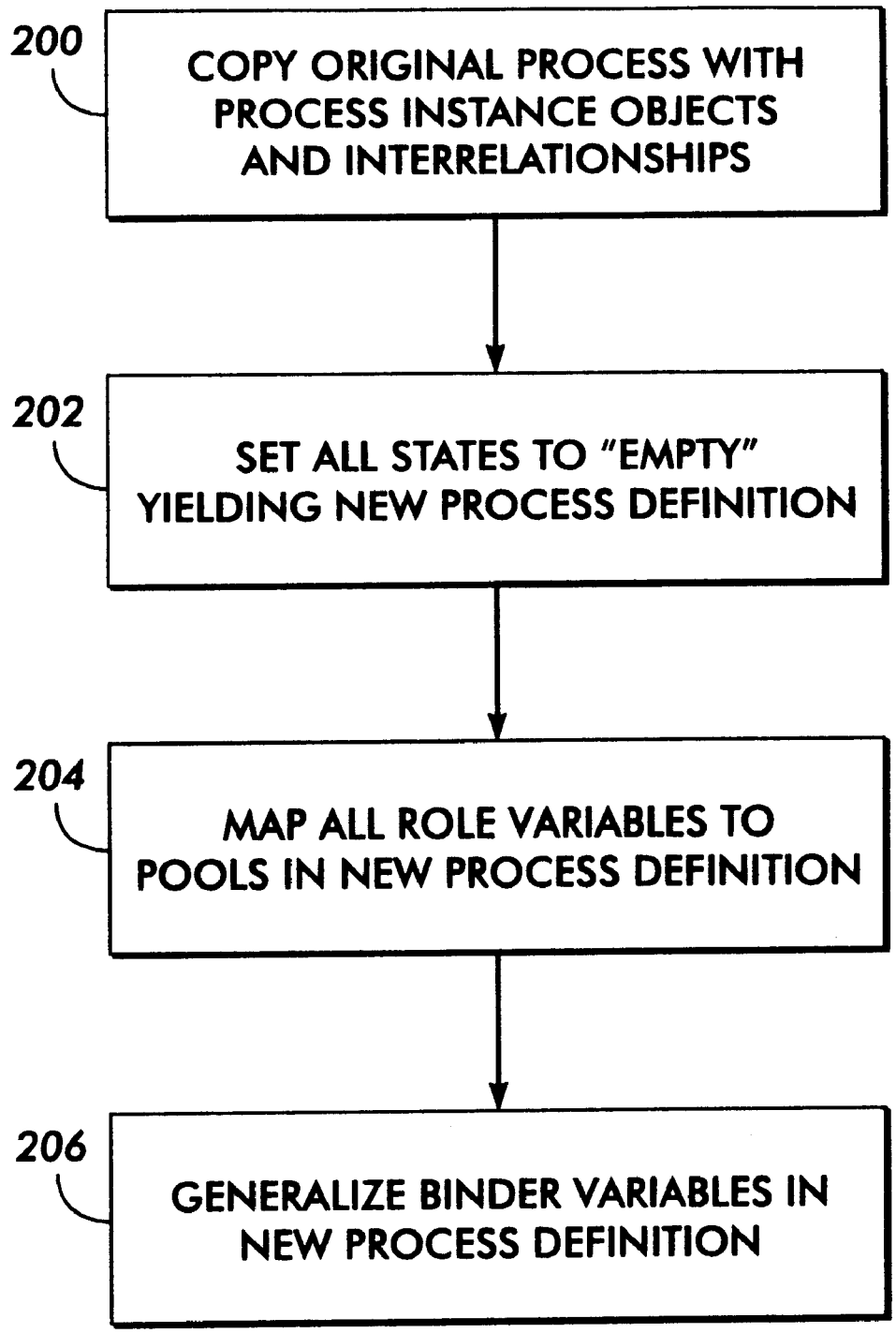
FIG. 3 is a flowchart illustrating the fundamental steps of the method of the present invention, within the context of workflow management software.

FIG. 3 is a flowchart illustrating the basic steps by which a generalized description of a workflow process, that is comprising process definition objects, can be derived from a pre-existing completed workflow process, which typically will include one or more process instance objects such as 106. First, the completed process comprising process instance objects, and which may have been created as the result of various ad-hoc contributions from many of the persons who collaborated in developing the process and who carry out the process, is copied to a memory, such as within the control of RBDMS 16. This copying step is shown as 200. Once the workflow describing the desired process is copied, the STATE variable in each of the objects forming the process are set to a time-independent value such as "empty," in the manner described above. This step is shown in FIG. 3 as 202. Once the STATE variables in the objects forming the process are set to time-independent values, other variables in the objects forming the process, such as the ROLE and BINDER variables can be generalized as well, as shown by the subsequent steps 204 and 206 in FIG. 3. Significantly, when a process is so copied, the interrelationships between the various task objects, that is the arrows between icons as shown in FIG. 1 above, are retained.

The editing of other variables (steps 204 and 206) in the process instance object 106 to obtain a process definition object 102 can be as follows. For example, if in the process instance object 106 a particular task was performed by "manager Williams," as part of the create template operation, this ROLE variable can be changed to something more general, i.e. mapped to a pool such as "managers: [Smith, Jones, Williams]." This can be done, for example, by retaining in the software an algorithm which maps the names of managers to a pool describing a group of managers, any of whom could perform the specified role ("manager approves expense report") in the general case. Thus, if "manager Williams" is entered into the original process instance object 106, this entry can be mapped to a template-level variable "managers: [Smith, Jones, Williams]" in the resulting process definition object 102. This step of generalizing the ROLE variables is shown in FIG. 3 as 204.

It will be noted that, when an entire process including a plurality of objects is copied to form a process definition, every object within a single process can be so generalized in its own way. Just as a "managers" ROLE variable can map to a pool of managers in the generalized process definition, the process instance object for "administrator keys in expense report," having "Tom" in its ROLE, can be mapped to a pool such as "administrators: [Tom, Dick, Harry]." The entity in the ROLE variable is mapped to a variable which describes a group of entities which includes the entity.

Similarly, the BINDER variable in process instance object 106, which causes the object 106 to refer to some external document when a task is performed, can be generalized as well for the process definition object 102. For instance, if all possible expense reports to be processed are retained electronically and retrieved from a predetermined set of nested folders in a predetermined drive, such as "W:/managers/expense reports/to be approved/345.doc," with 345.doc being the name of the actual expense report that was approved via process object 106, the generalized process definition object such as 102 could include in its BINDER variable as much information as necessary (as described in the claims, a "field" of information) without referring to any specific document, so that in this example the BINDER would be "W:/managers/expense reports/to be approved/ *.doc," *.doc being a wild-card variable. In this way the BINDER variable can be generalized just enough to permit the object to serve as a process definition, as opposed to a process instance. This step of generalizing the BINDER variables in each object is shown in FIG. 3 as 206.

Once all of the desired variables in the various objects describing the workflow are generalized, the final result is a completely generalized process definition in which all of the individual objects are generalized in their relevant variables, so that this new generalized process definition can simply be "plugged in" to an existing system, either replacing a previous process definition or making an additional choice available, with a minimum of additional work.

FIGS. 4A–4D represent a sequence of snapshots of the same process instance, each process comprising the same basic set of tasks or task objects, illustrating how an existing process can be modified on an ad-hoc basis to create a new process.

Figure 4A:
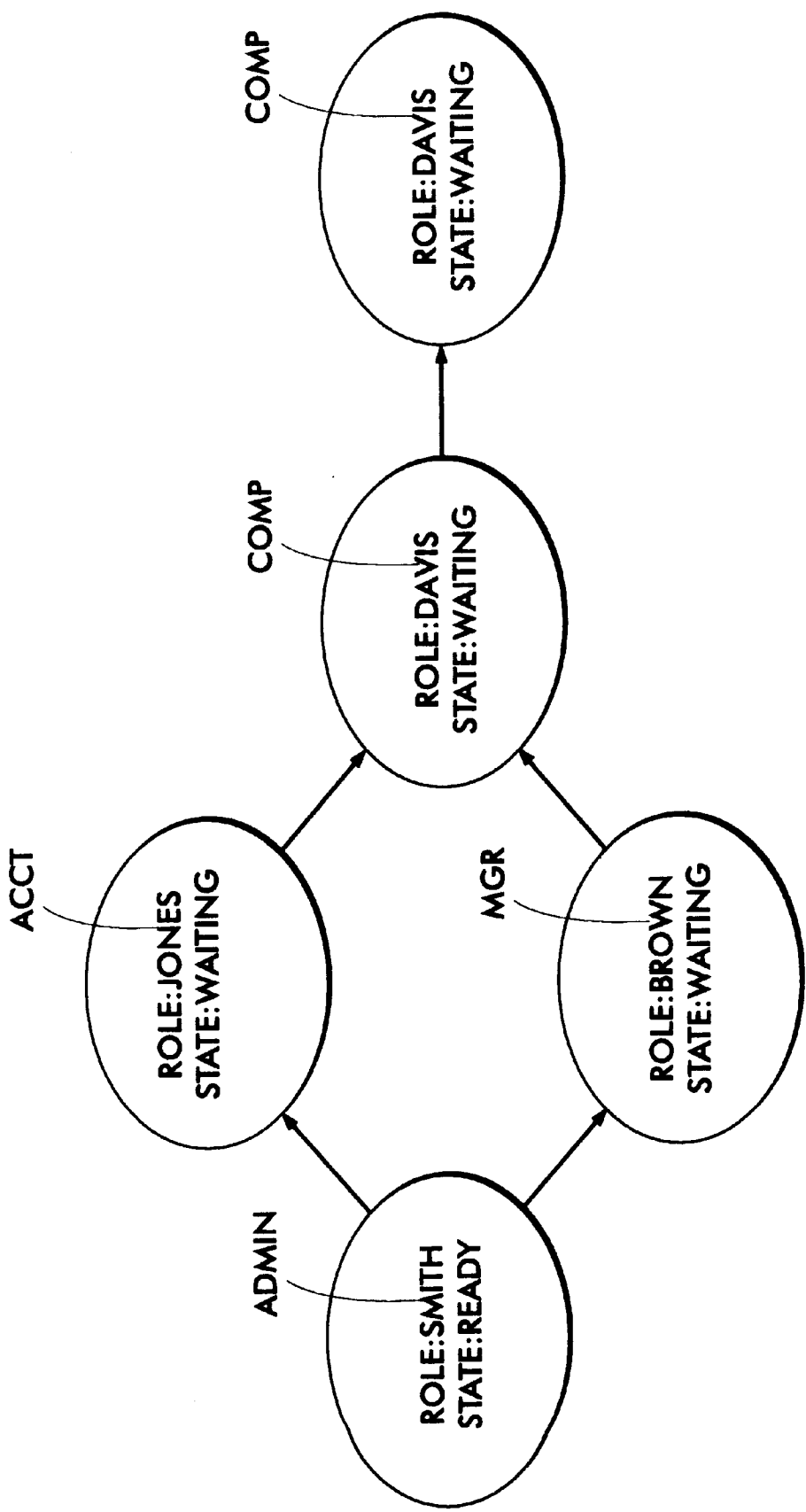
FIGS. 4A–4D each represent a collection of objects, each object representing a task, the tasks together forming a workflow process instance, in a sequence illustrating how a process instance can be modified and then generalized according to the present invention

FIG. 4A is a set of interrelated task objects, each with a ROLE and STATE variable, corresponding to the process generally described in FIG. 1. FIG. 4A is in effect a snapshot of a process during the "instantiation" portion of its lifecycle, as described above. (Each of the illustrated objects will of course include a "NAME" and one or more "BINDER" variable spaces as well, but these are not directly relevant to the discussion. However, the general descriptions given in FIG. 1 above could conceivably be used as the "NAME" for each object in FIG. 4A.) As shown in FIG. 4A the ROLE variables will be filled with either the name of a single specific person to carry out the task, such as in a process instance, or, alternately, the ROLE variables could map to pools such as administrative assistant (ADMIN), accountant (ACCT), manager (MGR), or comptroller (COMP), each pool including one or more variable names of persons who can carry out the particular function in the workflow. Further as shown in FIG. 4A, the STATE variables are shown just before the workflow begins, with an expense report (such as shown in FIG. 1) being submitted to the system. Thus, the STATE variable for the first task is READY, and the STATE variable for all the other task instances is WAITING.

Figure 4B:
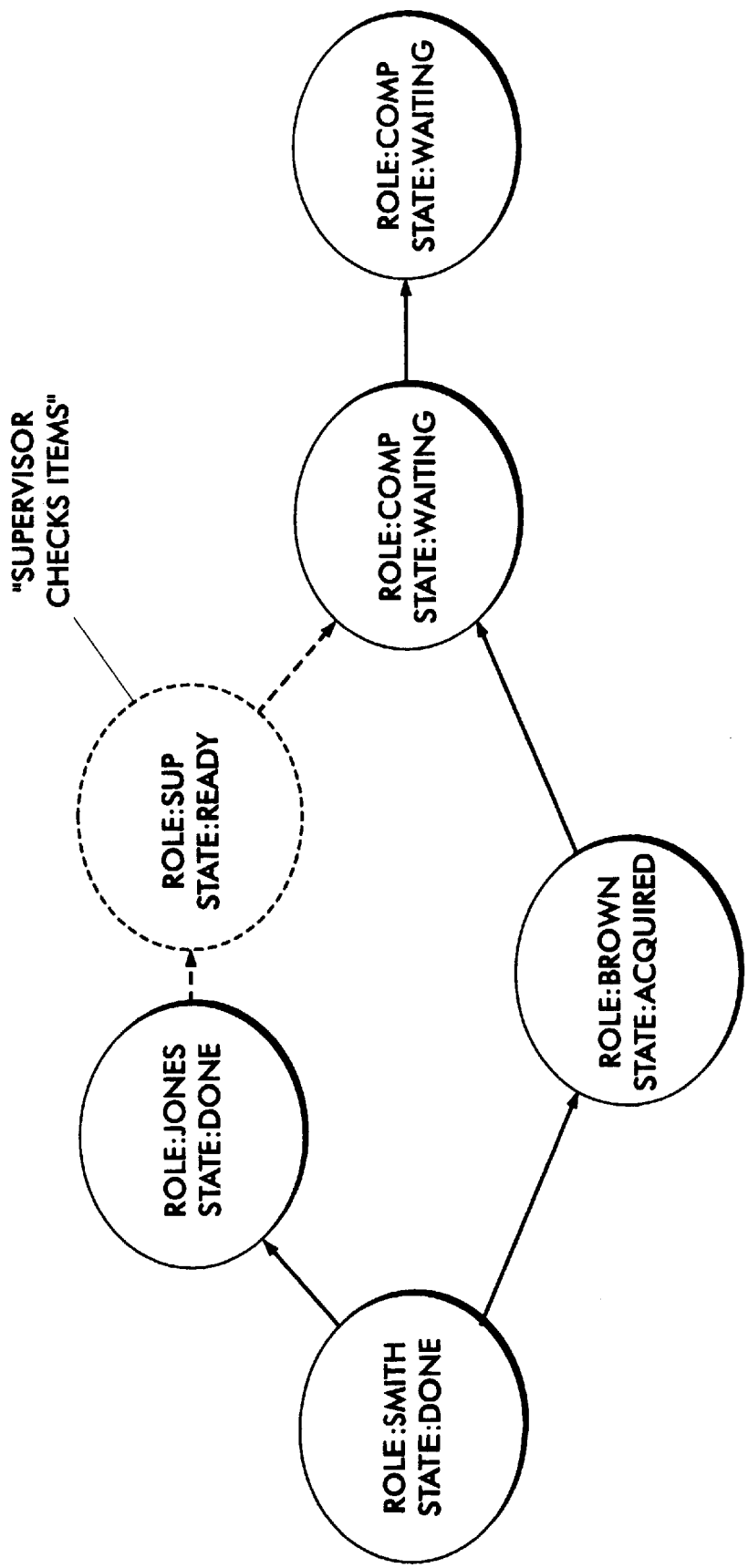

FIG. 4B illustrates the same process instance as in FIG. 4A, following a dynamic insertion of an additional task object. FIG. 4B is a snapshot of a process during the enactment portion of its life-cycle, as described above. The fact that the process instance in FIG. 4B is only partially completed is evidenced by the fact that those tasks which are DONE or ACQUIRED have been assigned to specific persons SMITH, JONES, BROWN, while the comptroller COMP has yet to be assigned to a specific person. In this example, the accountant ACCT, who in this particular instance is a actual person named JONES, has decided that he would like to insert another task into the workflow, that of having his supervisor, here called SUP (as opposed to the manager MGR of the person who submitted the expense report) check the items in the expense report before the expense report is sent on to the comptroller COMP.

In a preferred embodiment of the present invention, a person (such as a person corresponding to one of the ROLEs) can be enabled to "forward" the work, or in other words insert a task, into the particular process instance. As can be seen by the STATE variables in FIG. 4B, the accountant JONES has completed his particular task, while the manager MGR is still working on his task (MGR is the ROLE variable until the task is assigned to a specific person), although the comptroller has still not received the expense report. However, the accountant ACCT is enabled to create this new object "supervisor checks items," and assign this object a NAME, ROLE, BINDERs, and a time-independent STATE, which in this case is READY. For now, the accountant ACCT can create this extra task just for the one process instance he happens to be working on.

Figure 4C:
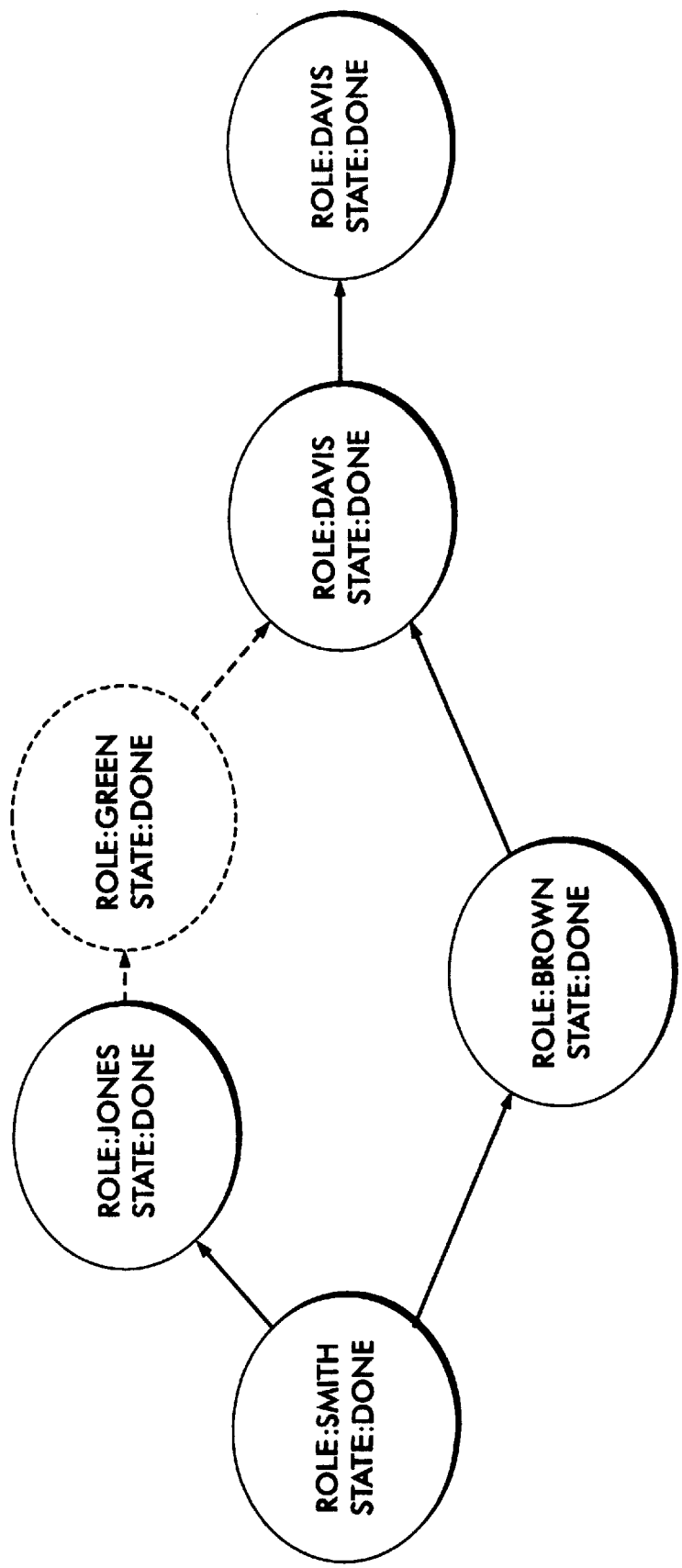

FIG. 4C shows the modified process instance of FIG. 4B, after all of the tasks have been completed. As can be seen, in FIG. 4C, all of the STATEs are now DONE, and all the ROLE variables have been assigned to the specific persons who carried out each individual task. If, in this example, the accountant JONES has decided that the ad-hoc desire to submit the expense report to supervisor GREEN is an idea that could possibly become a fixed part of the overall process, according to the present invention, the accountant JONES (or any person so empowered) can take the ad-hoc process instance such as shown in FIG. 4C, and, in essentially one step, generalize all of the ROLE and STATE variables to create a process definition from a process instance such as shown in FIG. 4C. This empowerment of certain people, such as (but not limited to) the persons within a particular pool associated with an existing task object, to create new task objects within the process, can be carried out using the "permissions" concept familiar in object-oriented programming. The new object is related to its neighboring objects through known means, such as the "finish-start" (FS) function.

Figure 4D:
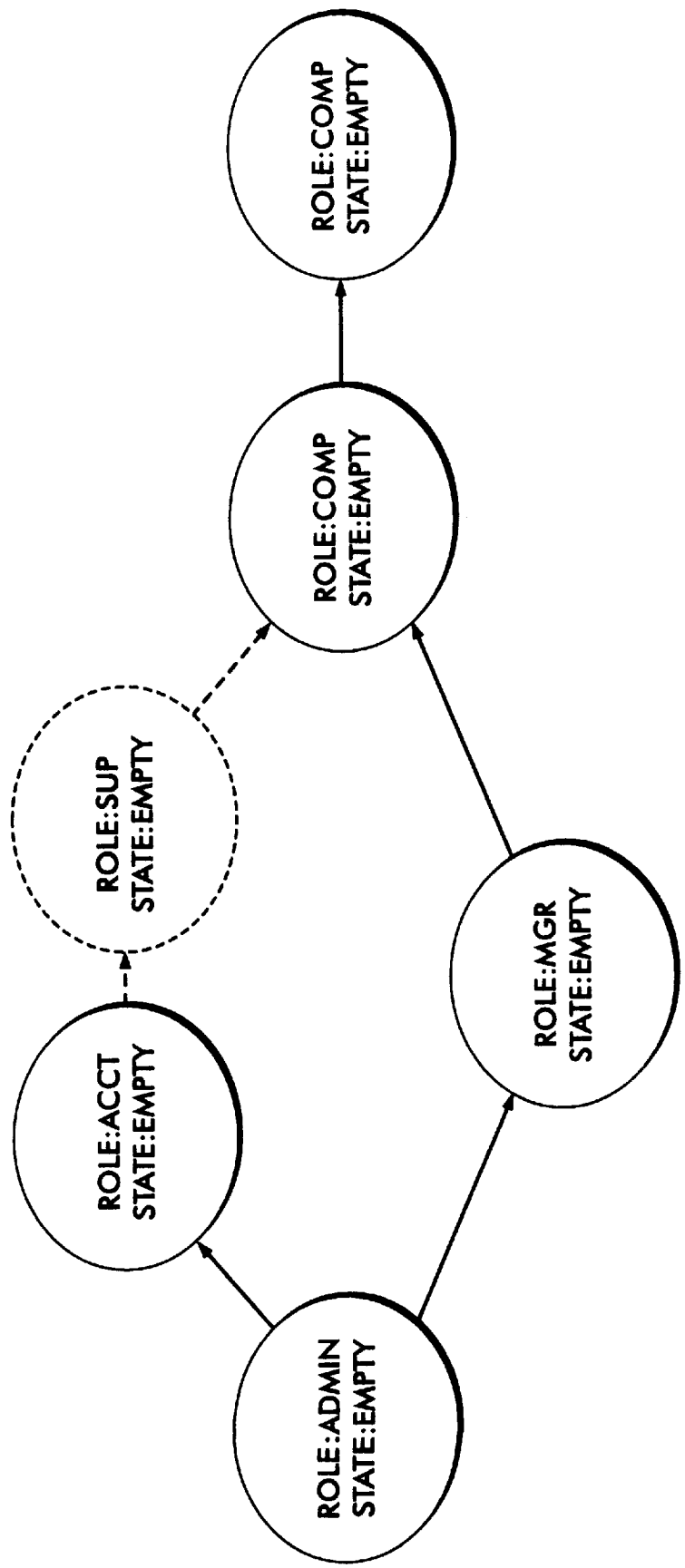

FIG. 4D shows a process definition derived from the modified process instance of FIG. 4C. The ROLE variables which were specific to individual persons in FIG. 4C have been all generalized to their corresponding pools in FIG. 4D, and further all of the STATE variables have been changed from DONE in the process instance of FIG. 4C to EMPTY in the process definition of FIG. 4D. Although not shown, the BINDER variables for each task in the process would be generalized as well, in a manner such as described above. Thus, the present invention enables an essentially "improvised" process, such as created by those persons assigned to ROLEs within the process, to be readily generalized into a new process definition. Although the example of FIGS. 4A–4D show the simple case of adding an extra task to a process, it will be evident that, if multiple persons assigned to ROLEs within a process are each empowered to "forward" the work and create new task objects, a more complicated process could in effect be "authored" by those persons who are responsible for individual tasks within the process.

Although in the above example the workflow process instance was modified by adding a new task object, a process instance can be modified in other ways as well. For instance, instead of adding a task object, it may be decided that a previously-mandated task is not in fact necessary, and so the task instance could be deleted from the process instance. Alternately, if it is decided that more information is needed to perform a certain task, the task instance can be modified by adding another binder variable space, which takes into account the new document that is needed to perform the task.

The above-described technique of copying an existing workflow description and generalizing the description as described above provides a significant real-world advantage in the use of workflow software. For example, a change in corporate policy, which would require a new level of approval to be added to a given process, could be manifest simply by taking the existing workflow description, and adding an icon in the necessary place through the UI, reflecting the change in policy. What is new with the present invention is revising actual instances of the process definition during execution and then generalizing from an instance. The revised workflow can thus be tried out with real data a few times, such as to determine exactly how the new policy is to be implemented in a workflow sense. However, once the amended process has been successfully completed to general satisfaction, one workflow description describing the most desirable state can be retrieved from memory and then copied, and then this copied workflow (which would include actual process instance objects) would be generalized to accept variables for future use. In the absence of the invention, if an appropriate person (e.g., a process designer) wanted a new process definition that had the new ad-hoc task included they would have to edit the original process definition (or a copy thereof) and manually replicate the same change (insertion of a task) that was done on the instance. The present invention enables them to do this more directly from the process instance that already has the desired changes.

The overall effect of the improvement of the present invention on workflow software is to enable amendments to a workflow to be made from the "bottom up," that is, by persons with intimate knowledge in collaborating in the work process, as opposed to having to refer to a separate process designer who would have to impose the amendment "from above." Also, for extremely complicated workflow processes, the improvement readily enables experimentation with different workflows, measurement of which workflows have been most successful, and then copying of the most successful workflows to be generalized into a new procedure for future workflows. In summary, the improvement of the present invention allows the actual persons who collaborate on a work process, who would have the most nuanced knowledge of what is successful and efficient in a work process, to directly contribute to altering the work process as needed.

While the invention has been described with reference to the structure disclosed, it is not confined to the details set forth, but is intended to cover such modifications or changes as may come within the scope of the following claims.

We claim:

1. A computer-implemented method of creating a process definition describing a generic workflow process, from a process instance describing an actual process execution, said process instance including a plurality of task objects defined in object-oriented computer software, each task object corresponding to a task in the workflow, each task object including a role space for holding a role variable symbolic of an entity required to perform a task, a binder space for holding a binder variable referring to a quantity of information required to perform the task, and a state space for holding a state variable symbolic of a current state of the task corresponding to the object, the method comprising the steps of:

copying, in a computer, the task objects forming the process instance and preserving the interrelationships among task objects, thereby yielding a copied process, and changing the variable in the state space in every task object in the copied process to a time-independent value, thereby yielding a new process definition for use by the computer.

2. The method of claim 1, further comprising the step of altering the role variable in at least one task object in the copied process from a variable describing a specific entity to a variable describing a pool of entities.

3. The method of claim 1, further comprising the step of altering the binder variable in at least one task object in the copied process from a variable identifying a specific quantity of information to a variable describing a field of information.

* * * * *